(12) United States Patent
Hutchison et al.

(10) Patent No.: US 10,579,273 B2
(45) Date of Patent: Mar. 3, 2020

(54) MAINTAINING CORRECT I/O STATISTICS FOR ALTERED DATA MIGRATED WITHIN A TIERED STORAGE ENVIRONMENT

(71) Applicant: International Business Machines Corporation, Armonk, NY (US)

(72) Inventors: Gordon D. Hutchison, Eastleigh (GB); Miles Mulholland, Chandlers Ford (GB); Lee J. Sanders, Chichester (GB); Ben Sasson, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 15/585,455

(22) Filed: May 3, 2017

(65) Prior Publication Data

US 2018/0321858 A1 Nov. 8, 2018

(51) Int. Cl.
*G06F 3/06* (2006.01)
(52) U.S. Cl.
CPC .......... *G06F 3/0611* (2013.01); *G06F 3/0604* (2013.01); *G06F 3/0647* (2013.01); *G06F 3/0653* (2013.01)
(58) Field of Classification Search
CPC ...... G06F 3/0611; G06F 3/0647; G06F 3/065; G06F 3/0652; G06F 3/0653; G06F 3/067
See application file for complete search history.

(56) References Cited

U.S. PATENT DOCUMENTS

| | | | |
|---|---|---|---|
| 8,667,032 B1 | 3/2014 | Shilane et al. | |
| 9,256,374 B1 | 2/2016 | Aron et al. | |
| 9,460,102 B1 | 10/2016 | Bono et al. | |
| 9,483,484 B1 * | 11/2016 | Sridharan | G06F 17/30153 |
| 9,703,664 B1 * | 7/2017 | Alshawabkeh | G06F 11/3414 |
| 2004/0225682 A1 * | 11/2004 | Murman | G06Q 10/06 |
| 2013/0297894 A1 * | 11/2013 | Cohen | G06F 3/0679 |
| | | | 711/154 |
| 2014/0095448 A1 * | 4/2014 | Marwah | G06F 3/0649 |
| | | | 707/667 |
| 2014/0281312 A1 * | 9/2014 | Danilak | G06F 3/0688 |
| | | | 711/162 |
| 2014/0337576 A1 * | 11/2014 | Burton | G06F 3/0689 |
| | | | 711/114 |
| 2015/0205525 A1 * | 7/2015 | Chiu | G06F 3/061 |
| | | | 711/162 |

* cited by examiner

*Primary Examiner* — Glenn Gossage
(74) *Attorney, Agent, or Firm* — Nelson and Nelson; Daniel P. Nelson; Alexis V. Nelson

(57) ABSTRACT

A method for maintaining I/O statistics in a tiered storage environment includes maintaining, by a tiered storage layer within a storage system, I/O statistics for data storage elements or areas within the storage system. The tiered storage layer migrates data between storage tiers in accordance with the I/O statistics. A data services layer, that operates independently from the tiered storage layer, alters (e.g., compresses, decompresses) selected data within the storage system and generates a message to the tiered storage layer describing the alteration. The message identifies the selected data, how the selected data before the alteration maps to the selected data after the alteration, and an operator (e.g., percentage) to be applied to I/O statistics associated with the selected data as a result of the alteration The tiered storage layer receives this message and modifies its internal I/O statistics accordingly. A corresponding system and computer program product are also disclosed.

15 Claims, 7 Drawing Sheets

MAINTAINING CORRECT I/O STATISTICS FOR ALTERED DATA MIGRATED WITHIN A TIERED STORAGE ENVIRONMENT

BACKGROUND

Field of the Invention

This invention relates to systems and methods for maintaining correct I/O statistics in a tiered storage environment.

Background of the Invention

In today's tiered storage environments, the "hotness" or "coldness" of data may be continually monitored so that it can be optimally placed on storage media. For example, "hot" (i.e., frequently accessed) data may be placed on faster, more expensive storage media (e.g., solid state drives) to improve I/O performance. "Cold" (i.e., less frequently accessed) data may be placed on slower, less expensive storage media (e.g., hard disk drives) with reduced I/O performance. As the temperature of the data changes, the data may be migrated between storage tiers to optimize I/O performance.

In order to determine the temperature of data and optimize placement in a tiered storage environment, I/O statistics may be maintained for logical and/or physical storage areas in the tiered storage environment. When I/O starts for a new physical storage area, there may be little or no information as to the hotness of coldness of data contained therein. This results in data that may initially be stored on non-optimal storage media, such as slower or more expensive storage media than is desirable. As I/O statistics are compiled for the data over time, the temperature of the data may "settle" to enable more optimal placement on the storage media.

Obtaining accurate I/O statistics that have "settled" may be undermined by recent technology (e.g., "gathered writes," etc.) that prevents data from being located at a stable physical location and does away with the one-to-one relationship between logical and physical storage. At the same time, this technology may be helpful to achieve features such as data deduplication and compression. When data changes in size (e.g., due to compression, decompression, etc), redundancy (e.g., due to deduplication, duplication, etc.), form (e.g., due to splitting, consolidation, interleaving, de-interleaving, etc.), or location, I/O statistics associated with the data may become invalid or obsolete. This may require discarding the I/O statistics and compiling new I/O statistics for the data over time. Meanwhile, the data may not be optimally placed on tiered storage media due to the lack of accurate I/O statistics.

In view of the foregoing, what are needed are systems and methods to maintain correct I/O statistics in a tiered storage environment, even in situations where data operations render I/O statistics invalid or obsolete. Ideally, such systems and methods will enable more optimal placement of data on tiered storage media.

SUMMARY

The invention has been developed in response to the present state of the art and, in particular, in response to the problems and needs in the art that have not yet been fully solved by currently available systems and methods. Accordingly, systems and methods are disclosed to maintain I/O statistics in a tiered storage environment. The features and advantages of the invention will become more fully apparent from the following description and appended claims, or may be learned by practice of the invention as set forth hereinafter.

Consistent with the foregoing, a method for maintaining I/O statistics in a tiered storage environment is disclosed. In one embodiment, such a method includes maintaining, by a tiered storage layer, I/O statistics for data storage elements or areas within a storage system. The tiered storage layer migrates data between storage tiers in accordance with the I/O statistics. A data services layer, separate from the tiered storage layer, alters selected data within the storage system and generates a message to the tiered storage layer describing the alteration. The tiered storage layer receives this message and modifies its internal I/O statistics in accordance with the alteration described in the message.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
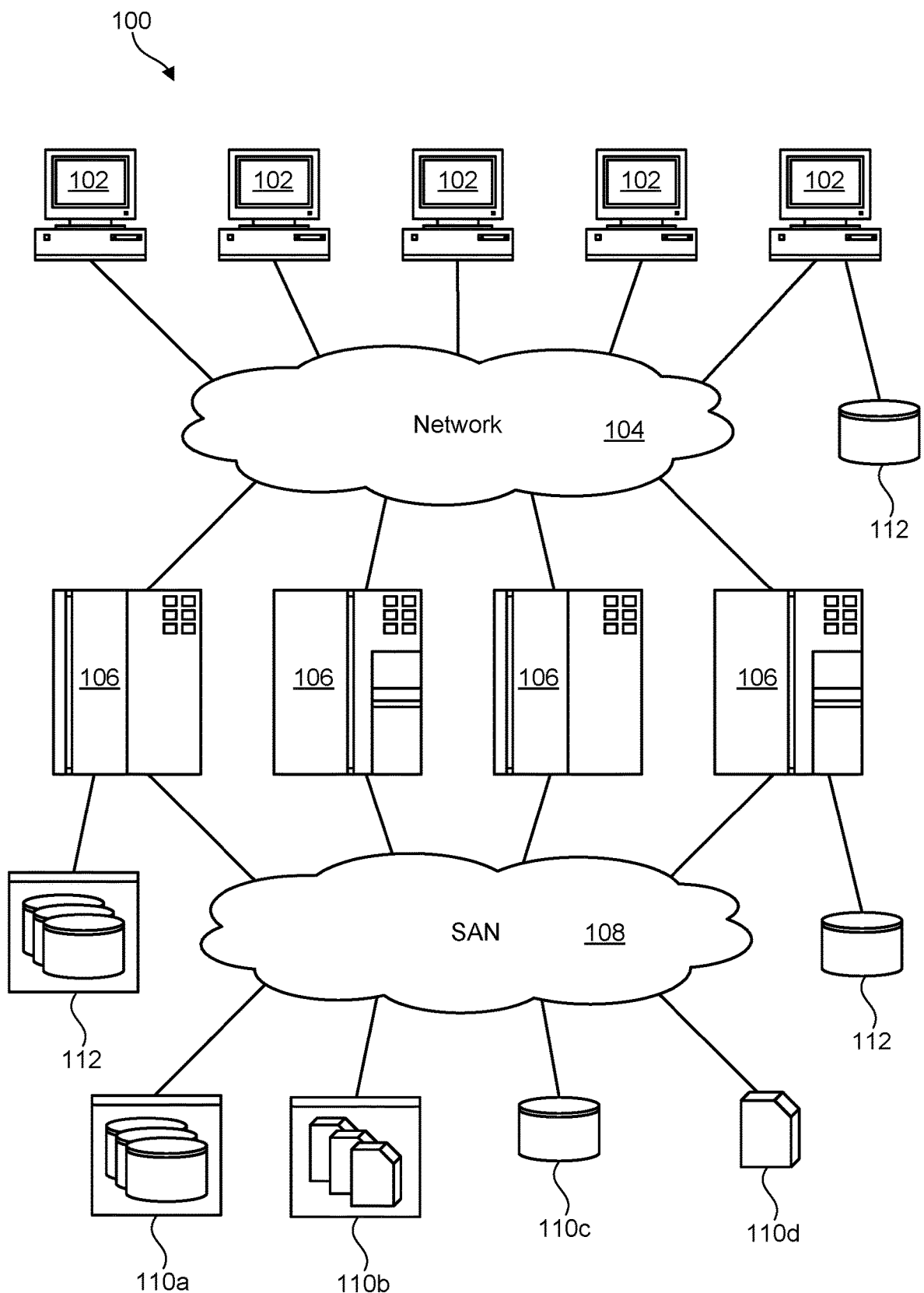
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory "stick", a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers interconnected by a network 104. The network 104 may include, for example, a local-area-network (LAN), a wide-area-network (WAN), the Internet, an intranet, or the like. In certain embodiments, the computers may include both client computers 102 and server computers 106 (also referred to herein as "host systems"). In general, the client computers 102 initiate communication sessions, whereas the server computers 106 wait for requests from the client computers 102. In certain embodiments, the client computers 102 and/or server computers 106 may connect to one or more internal or external direct-attached storage systems 112 (e.g., arrays of hard-disk drives, solid-state drives, tape drives, etc.). These client computers 102 and/or server computers 106 and direct-attached storage systems 112 may communicate using protocols such as ATA, SATA, SCSI, SAS, Fibre Channel, or the like.

The network environment 100 may, in certain embodiments, include a storage network behind the server computers 106, such as a storage-area-network (SAN) 108, as shown in FIG. 1, or a LAN (e.g., when using network-attached storage). The SAN 108 may connect the server computers 106 to one or more storage systems 110a-d, such as arrays 110a of hard-disk drives or solid-state drives, tape libraries 110b, individual hard-disk drives 110c or solid-state drives 110c, tape drives 110d, CD-ROM libraries, or the like. To access a storage system 110a-d, a host system or computer 106 may communicate over physical connections from one or more ports on the host system or computer 106 to one or more ports on the storage system 110a-d. A connection may be through a switch, fabric, direct connection, or the like. In certain embodiments, the server computers 106 and storage systems 110a-d may communicate using a networking standard such as Fibre Channel (FC).

Figure 2:
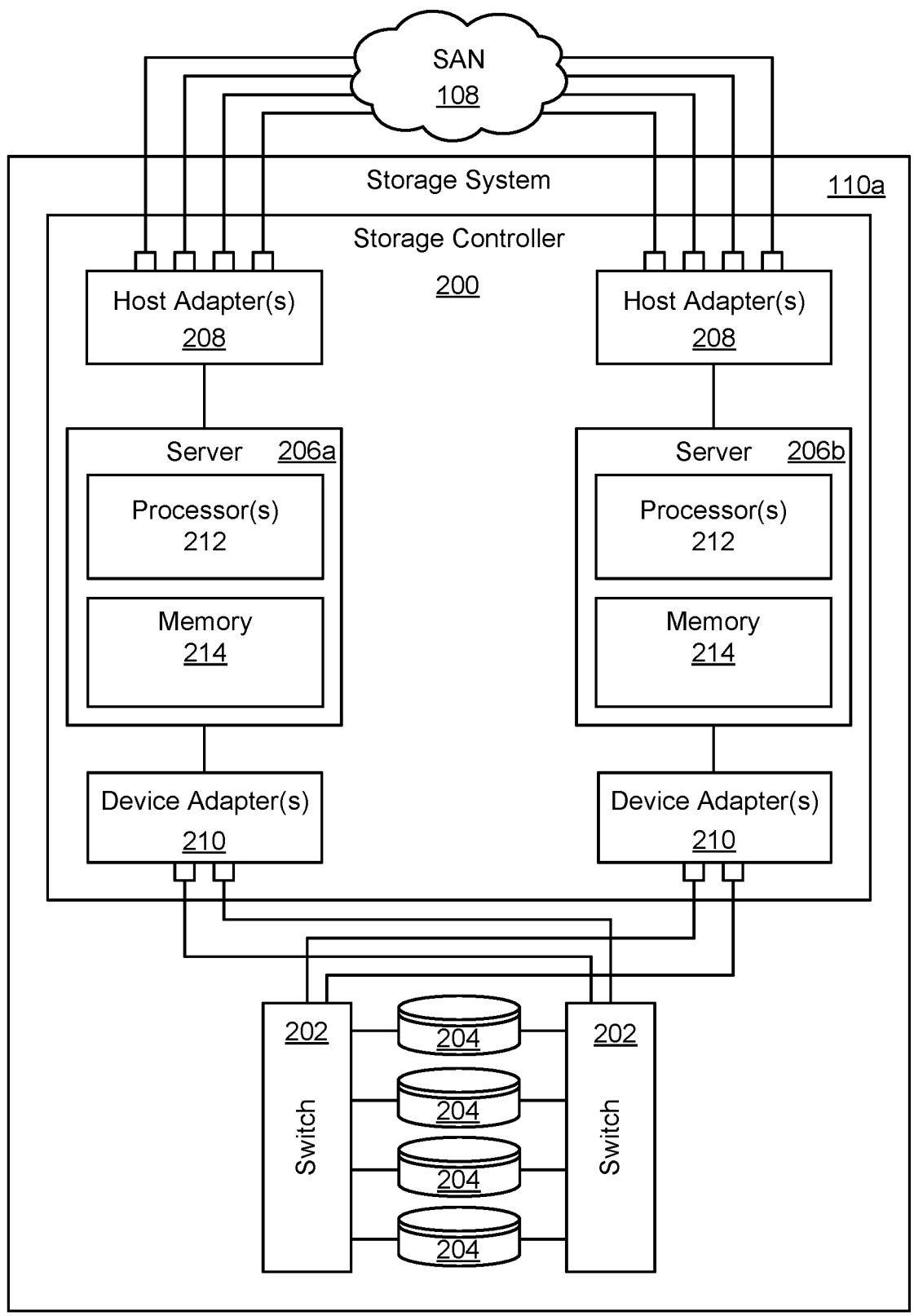
FIG. 2 is a high-level block diagram showing an example of a storage system containing an array of storage drives.

Referring to FIG. 2, one embodiment of a storage system 110a containing an array of storage drives 204, such as hard-disk drives and/or solid-state drives, is illustrated. The internal components of the storage system 110a are shown since certain functionality in accordance with the invention may be implemented within such a storage system 110a. As shown, the storage system 110a includes a storage controller 200, one or more switches 202, and one or more storage drives 204, such as hard disk drives or solid-state drives (such as flash-memory-based drives). The storage controller 200 may enable one or more host systems or computers 106 (e.g., open system and/or mainframe servers) to access data in the one or more storage drives 204.

In selected embodiments, the storage controller 200 includes one or more servers 206a, 206b. The storage controller 200 may also include host adapters 208 and device adapters 210 to connect the storage controller 200 to host systems or computers 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206a, 206b includes one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system, but may be implemented in any comparable or analogous storage system, regardless of the manufacturer, product name, or components or component names associated with the system. Furthermore, any storage system that could benefit from one or more embodiments of the invention is deemed to fall within the scope of the invention. Thus, the IBM DS8000™ is presented only by way of example and is not intended to be limiting.

Figure 3:
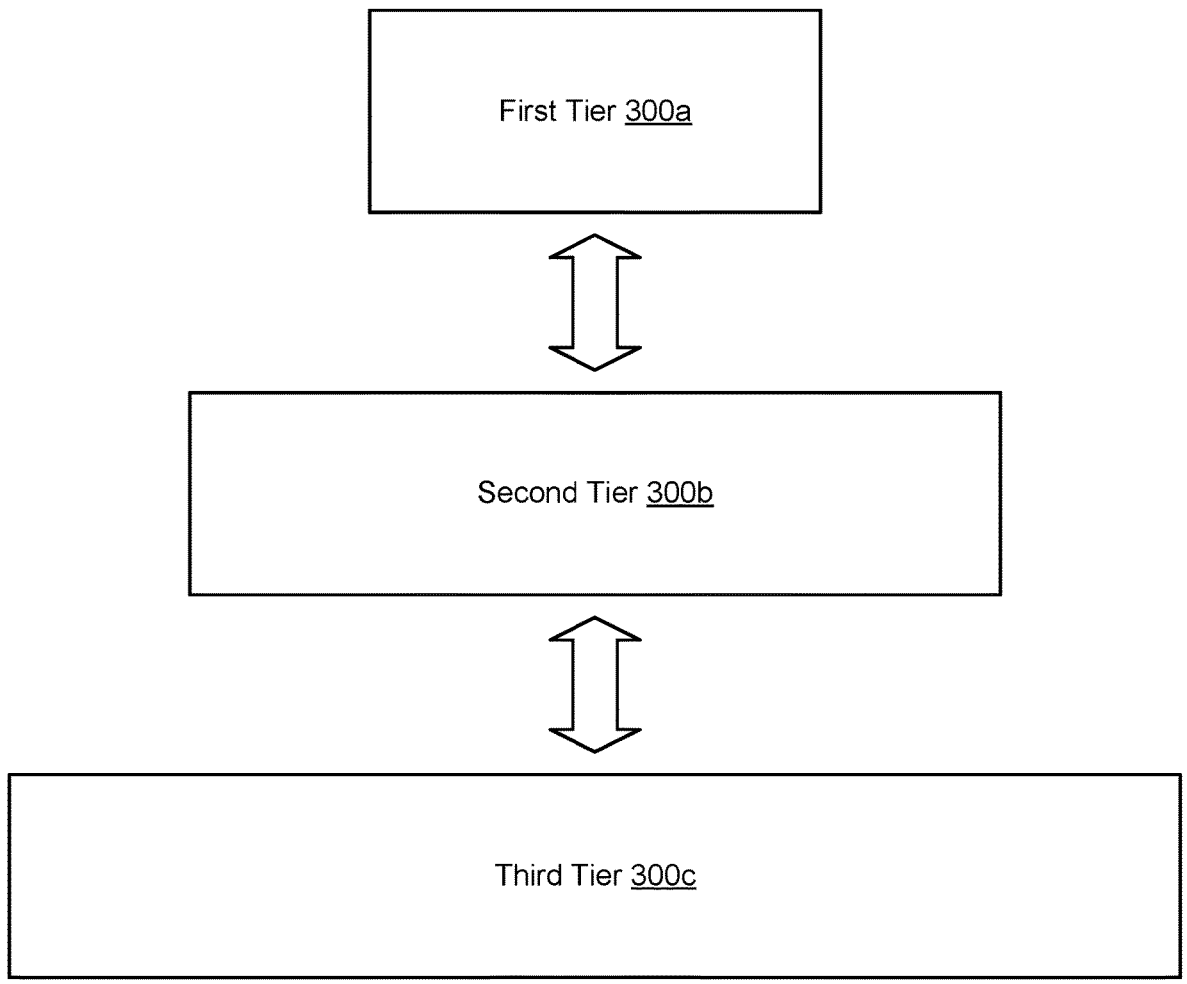
FIG. 3 is a high-level block diagram showing a tiered storage environment having storage tiers of differing cost and I/O performance.

Referring to FIG. 3, in certain embodiments, one or more storage systems 110 may be configured to provide tiered data storage. In such an environment, the "hotness" or "coldness" of data may be continually monitored so that it can be optimally placed on different storage tiers 300. For example, faster storage drives 204 (e.g., solid state drives) may make up a first storage tier 300a, intermediate performance storage drives 204 (e.g., higher performance hard-disk drives) may make up a second storage tier 300b, while slower storage devices (e.g., lower performance hard-disk drives) may make up a third storage tier 300c. "Hot" (i.e., frequently accessed) data may be placed on the first storage tier 300a to improve I/O performance, while "warm" (i.e., less frequently accessed) data may be placed on the second storage tier 300b. "Cold" (i.e., even less frequently accessed) data may be placed on the third storage tier 300c. As the temperature of the data changes, the data may be migrated between the storage tiers 300a-c to optimize I/O performance. The storage tiers 300a-c may be implemented within a single storage system 110 or potentially distributed across multiple storage systems 110. Similarly, additional (or fewer) tiers 300 may be provided where needed. The example described above is provided by way of example and not limitation.

In order to determine the temperature of data and optimize placement of the data in a tiered storage environment, I/O statistics may be maintained for logical and/or physical storage areas (e.g., extents) in the tiered storage environment. When I/O starts for a new storage area, little or no information may exist as to the hotness or coldness of data contained therein. This results in data that may initially be stored on non-optimal storage media, such as slower or more expensive storage media than is desirable. As I/O statistics are compiled for the data over time, the temperature of the data may "settle" to enable more optimal data placement within the tiered storage environment.

Obtaining accurate I/O statistics that have "settled" may be undermined by technology (e.g., "gathered writes," etc.) that prevents data from being located at a stable physical location and does away with the one-to-one relationship between logical and physical storage. This technology may be helpful, however, to perform functions such as data deduplication and compression. When underlying data changes in size (e.g., due to compression, decompression, etc), redundancy (e.g., due to deduplication, duplication, etc.), form (e.g., due to splitting, consolidation, interleaving, de-interleaving, etc.), or location, I/O statistics associated with the data may become invalid or obsolete. This may require discarding the I/O statistics and compiling new I/O statistics over time for the changed data. Meanwhile, the data may not be optimally placed on the tiered storage media due to the lack of accurate I/O statistics.

Figure 4:
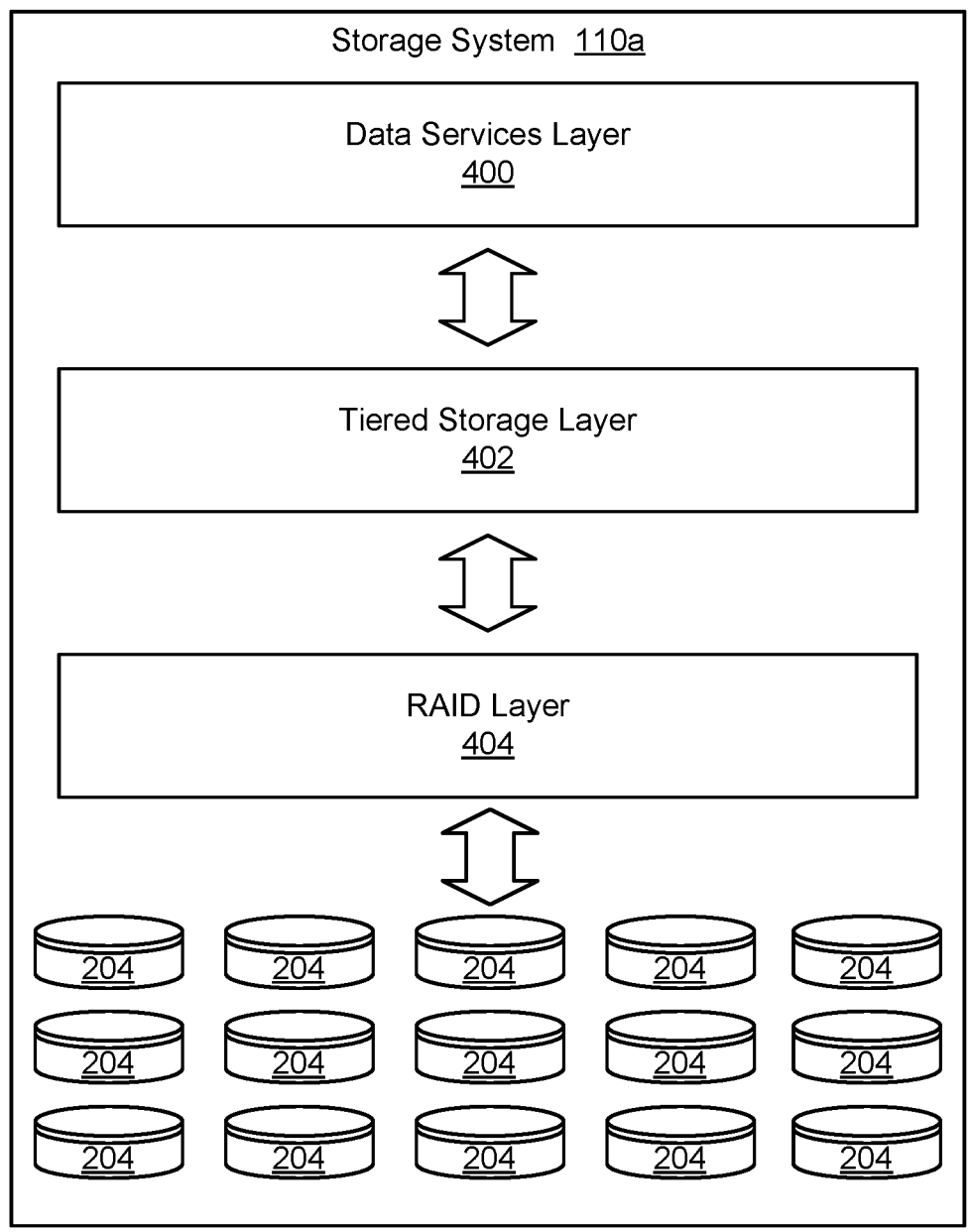
FIG. 4 is a high-level block diagram showing various layers that provide storage services and virtualization.

Referring to FIG. 4, in certain embodiments, a storage system 110a such as that illustrated in FIG. 2 may operate as a stacked system of components that each provide storage services to layers above and make use of layers below. For example, a data services layer 400 that provides services such as data deduplication, compression, interleaving, or the like, may sit above a tiered storage layer 402 that migrates data between different storage tiers 300a, 300b, 300c. In certain embodiments, the data services layer 400 may write data to specific logical locations and the layers 402, 404 below the data services layer 400 may map these logical locations to physical locations by way of a series of transformations. Each transformation may achieve some purpose of which storage tiering may be one. In certain embodiments, the tiered storage layer 402 works at the extent level (e.g., by moving extents of data between the storage tiers 300a, 300b, 300c), which is above a RAID level (as implemented by a RAID layer 404 that virtualizes storage resources on one or more storage drives 204), but below the data services layer 400. The layers 400, 402, 404 and associated transformations often work independently of one another in order to help manage complexity.

Because the layers 400, 402, 404 may work independently from one another, the layers 400, 402, 404 may in certain cases perform actions that undermine or affect the actions of other layers 400, 402, 404. For example, as previously mentioned, a tiered storage layer 402 may in certain embodiments maintain I/O statistics for each storage area (e.g., extent) that it manages to determine when and where to migrate data. The data services layer 400, by contrast, may manipulate (e.g., compress, de-duplicate, interleave, move, split, consolidate, etc.) data in a way that invalidates or affects the accuracy of I/O statistics of the tiered storage layer 402. In some cases, once certain data operations are performed, the tiered storage layer 402 may need to start from scratch in compiling I/O statistics for a given storage area or areas. This can require a significant amount of time and processing resources. In the meantime, data may not be optimally placed on the storage tiers 300 due to the lack of accurate I/O statistics.

Figure 5:
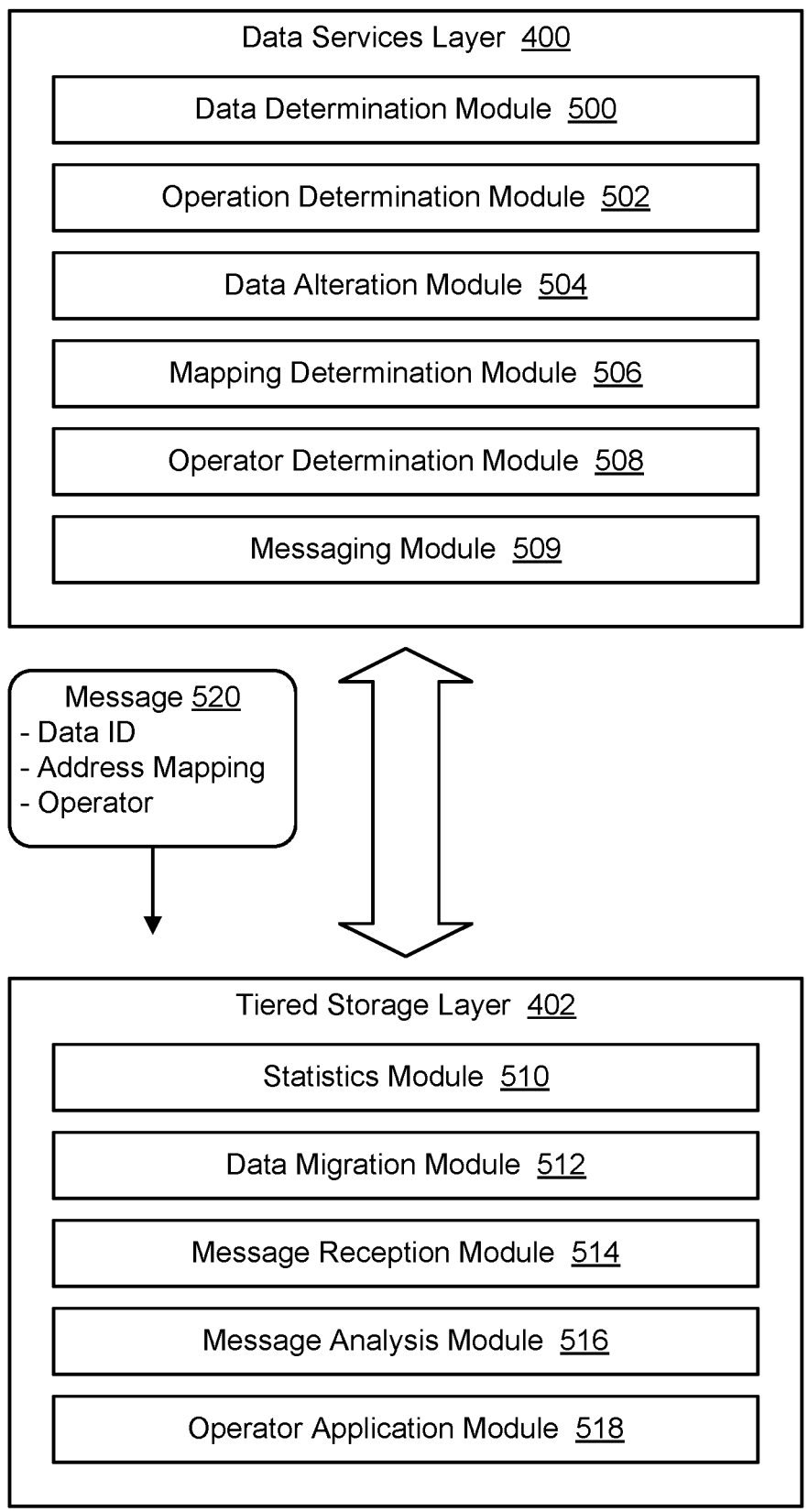
FIG. 5 is a high-level block diagram showing various modules that may be included in a data services layer and tiered storage layer.

Referring to FIG. 5, in order to address the issues identified above, systems and methods in accordance with the invention may enable communication between a data services layer 400 and tiered storage layer 402. Specifically, when the data services layer 400 operates on data in the tiered storage environment, the data services layer 400 may provide information about the operations to the tiered storage layer 402. The tiered storage layer 402 may then use this information to update its internal I/O statistics where appropriate. This may prevent the tiered storage layer 402 from having to discard old I/O statistics and start compiling new I/O statistics from scratch, saving both time and processing resources.

In order to provide the advantages and features discussed above, the data services layer 400 and tiered storage layer 402 may be configured with one or more sub-modules. These sub-modules may be implemented in software, firmware, hardware, or combinations thereof. The sub-modules are presented by way of example and are not intended to represent an exhaustive list of sub-modules that may be included in or associated with the data services layer 400 and tiered storage layer 402. The data services layer 400 and tiered storage layer 402 may include more or fewer sub-modules than those illustrated, or the functionality of the sub-modules may be organized differently.

As shown, the data services layer 400 may include one or more of a data determination module 500, operation determination module 502, data alteration module 504, mapping determination module 506, operator determination module 508, and messaging module 509. The tiered storage layer 402, by contrast, may include one or more of a statistics module 510, data migration module 512, message reception module 514, message analysis module 516, and operator application module 518.

The data determination module 500 may determine which data on the storage system 110a the data services layer 400 will operate on or change. This data may, in certain embodiments, be identified by a logical address or range of logical addresses. The operator determination module 508 may identify a function to be applied to the data. This function may include, for example, a compression or decompression function, a deduplication or duplication function, an interleaving or de-interleaving function, a splitting or consolidation function, a move function, or the like. Various potential functions will be discussed in association with FIGS. 6A through 7B.

The data alteration module 504 may apply the function to the data identified by the data determination module 500. As can be appreciated by those of skill in the art, functions such as those described above may change one or more of the size, location, continuity, or redundancy of data. Once a function is applied to the data, the mapping determination module 506 may determine how the mapping of the data changed. For example, a compression function may reduce the size of data and the mapping determination module 506 may determine how the old version of the uncompressed data maps to the new version of the compressed data. Similarly, a deduplication function may reduce the redundancy of data and the mapping determination module 506 may determine how eliminated copies of the data map to a single or smaller number of copies. An interleaving function may interleave data with other data and the mapping determination module 506 may determine how the old version of the data maps to the new version. A splitting function may split data into multiple pieces and store them in different locations and the mapping determination module 506 may determine how the old data maps to the new split version of the data. These represent just a few examples of how the mapping determination module 506 may determine how an old version of data maps to a new version.

The operator determination module 508 may determine an operator to be applied to I/O statistics associated with data that has been changed. For example, if a compression or decompression function has been applied to data that changes its size by a certain percentage, the operator may be a percentage to be applied to the I/O statistics associated with the data. Similarly, if a deduplication function is used to reduce a number of instances of data, the operator may specify a multiplier or other number that needs to be applied to the I/O statistics of the remaining instance or instances so that the I/O statistics reflect an increased amount of I/O that will be driven against the instance or instances. The opposite may be true for a duplication function that increases a number of instances of data and divides I/O between the multiple instances.

Once data is changed by the data services layer 400, the messaging module 509 may send a message 520 to the tiered storage layer 402 describing the change so that the tiered storage layer 402 may update its I/O statistics accordingly. In certain embodiments, the message 520 is sent to the tiered storage layer 402 immediately upon changing the data. In other embodiments, the message 520 is sent after some delay. For example, each time the data services layer 400 alters data in the tiered storage environment, the data services layer 400 may record message information in a list that is stored in a rotating buffer. As the buffer is about to wrap, the message information may be sent to the tiered storage layer 402 and the buffer may be reused for future messages 520.

The message 520 may take on various forms. In one embodiment, the message 520 identifies the data that was changed including any addresses or ranges of address that were modified as a result of the change, as well as the mapping between old and new addresses or address ranges. The message 520 may also include an operator that is to be applied to I/O statistics associated with the data that was changed. In other embodiments, the message 520 simply indicates which data was changed and the mapping from old to new data. The tiered storage layer 402 may use this information to determine which operator to use and how it should be applied to its internal I/O statistics.

Within the tiered storage layer 402, the statistics module 510 may maintain I/O statistics for storage areas (e.g., extents) in the tiered storage environment. The data migration module 512 may migrate data (e.g., extents of data or other levels of granularity) between storage tiers 300 in accordance with the I/O statistics. When a message 520 is sent from the data services layer 400 to the tiered storage layer 402, the message reception module 514 receives the message 520 and the message analysis module 516 analyzes the message 520 to determine which data was changed, the addresses and mapping of the data, and the operator that is to be applied to I/O statistics associated with the data. The operator application module 518 may apply the operator to the I/O statistics associated with the data that was changed. This process may be opaque to the data services layer 400. The updated I/O statistics may provide a best guess of the temperature of newly used or repurposed storage areas containing the changed data. This ideally avoids the need to rebuild I/O statistics from scratch only to possibly have them invalidated again before they have settled.

Figure 6A:
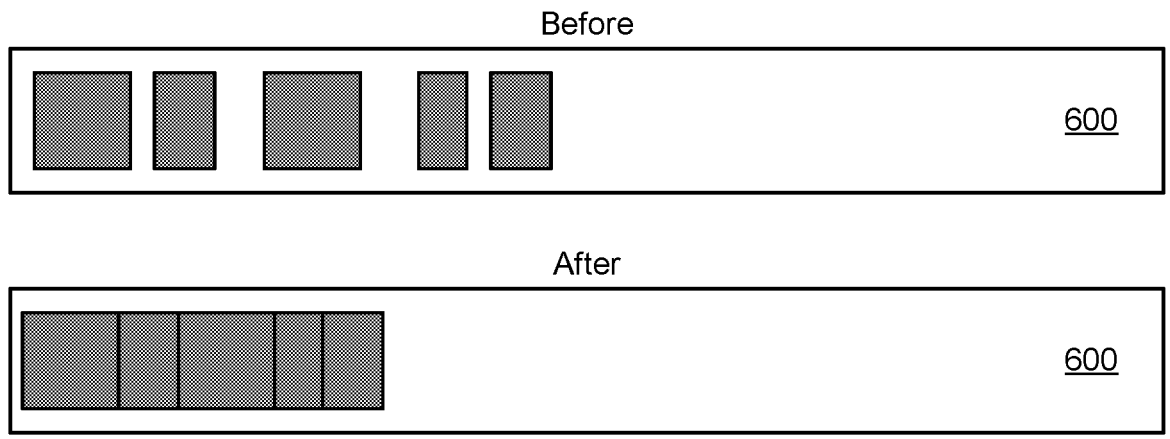
FIG. 6A is a high-level block diagram showing an example of data compression.

Referring to FIGS. 6A through 7B, various types of operations or functions that may be applied to data in a tiered storage environment are illustrated. FIG. 6A is a high-level block diagram showing an example of data compression. Area 600 is intended to represent an area of storage, such as one or more extents of storage space, both before and after data therein is manipulated. As shown in FIG. 6A, multiple pieces of data (shown by the shaded areas) may be compressed into a smaller storage area. The message 520 sent from the data services layer 400 to the tiered storage layer 402 may, in certain embodiments, indicate the old and new address range of the data and a percentage to be applied to I/O statistics associated with a storage area containing the data. The percentage may reflect the fact that more data is being concentrated in a smaller area and, as a result, more I/O will likely be associated with the smaller area. In certain embodiments, the percentage may be applied to (e.g., multiplied by) the I/O statistics associated with the smaller area so that the I/O statistics more closely reflect the temperature of the compressed data contained therein. For example, I/O statistics may be doubled for a storage area that contains data that has been compressed by fifty percent.

Figure 6B:
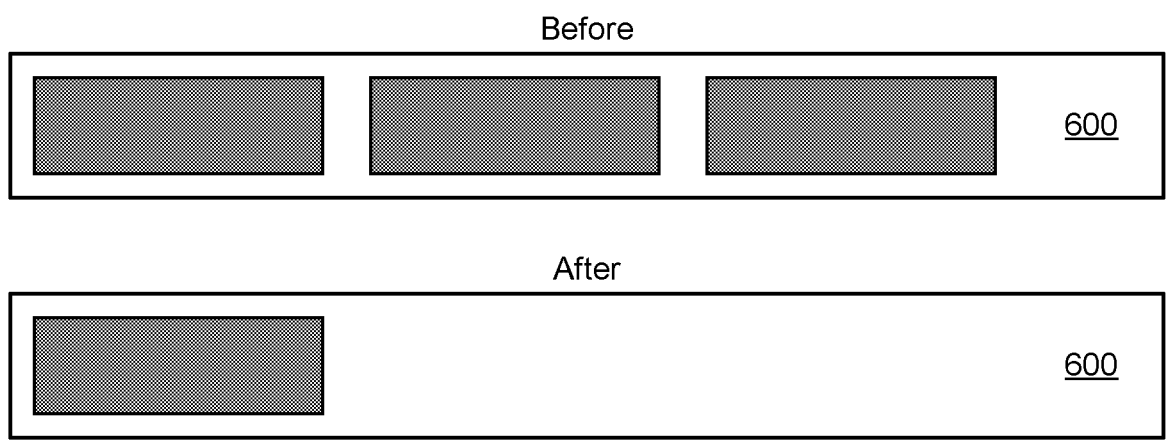
FIG. 6B is a high-level block diagram showing an example of data deduplication.

FIG. 6B is a high-level block diagram showing an example of data deduplication. Area 600 is intended to represent an area of storage, such as one or more extents of storage space, both before and after data is manipulated therein. As shown in FIG. 6B, multiple instances of data (shown by the shaded areas) may be reduced to a single instance. The message 520 sent from the data services layer 400 to the tiered storage layer 402 may, in certain embodiments, indicate the previous address ranges of the data, the new address range of the data, and/or a number reflecting how many instances of the data have been reduced to a single area. When data is deduplicated, I/O that was formerly split between multiple instances of the data may be concentrated onto a single or smaller number of instances. The I/O statistics associated with this single or smaller number of instances may be determined by summing the I/O statistics of the original instances. It follows that where data is replicated to create n instances, and I/O formerly concentrated a single instance is distributed across the n instances, the temperature of each instance may be 1/n of the temperature of the original single instance.

Figure 7A:
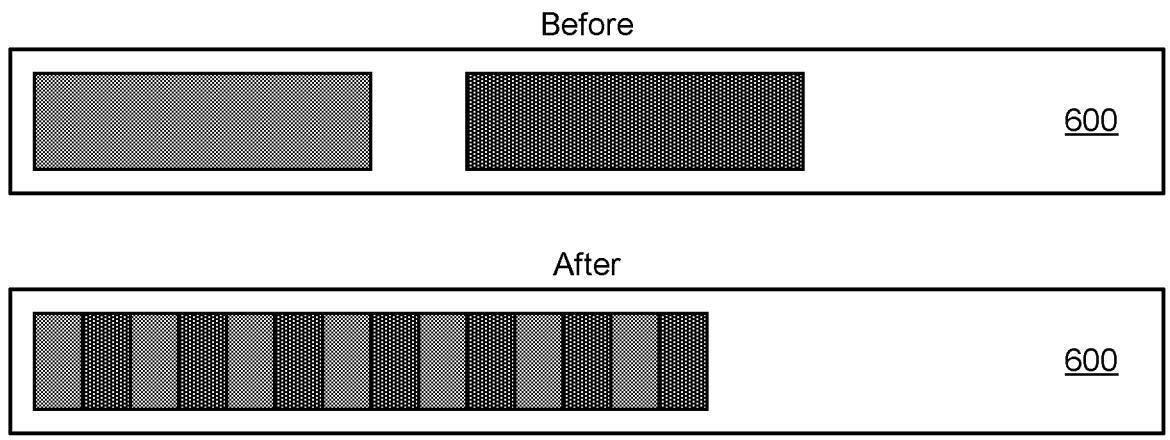
FIG. 7A is a high-level block diagram showing data interleaving.

FIG. 7A is a high-level block diagram showing an example of data interleaving. Area 600 is intended to represent an area of storage, such as one or more extents of storage space, both before and after data is manipulated therein. As shown in FIG. 7A, two pieces of data (shown by the two shaded areas) may be broken up and interleaved with one another. The message 520 sent from the data services layer 400 to the tiered storage layer 402 may, in certain embodiments, provide a list of interleaved address ranges. The tiered storage layer 402 may use these address ranges to reorganize its I/O statistics to correspond to the new location of the interleaved data. In certain embodiments, the I/O statistics for two data pieces that are interleaved may be calculated by averaging the I/O statistics of the original data pieces.

Figure 7B:
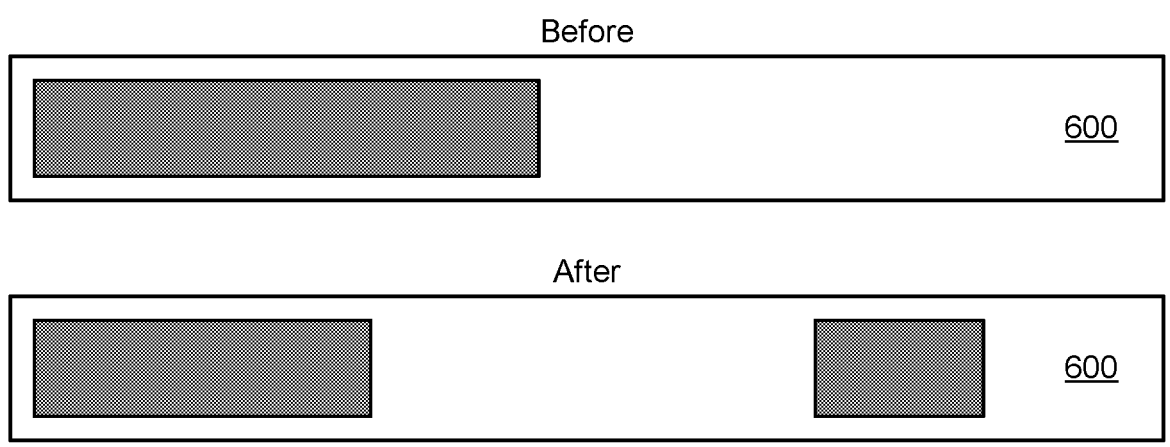
FIG. 7B is a high-level block diagram showing an example of data splitting.

FIG. 7B is a high-level block diagram showing an example of data splitting. Area 600 is intended to represent an area of storage, such as one or more extents of storage space, both before and after data is manipulated therein. As shown in FIG. 7B, a single continuous piece of data (shown by the two shaded areas) may be broken up into two separate pieces. The message 520 sent from the data services layer 400 to the tiered storage layer 402 may, in certain embodiments, provide the address ranges of the data after it was split. The tiered storage layer 402 may use these address ranges to reorganize its I/O statistics to correspond to the new locations of the data. For example, if twenty-five percent of a data piece is split from an original piece and moved to a new location, the remaining original data piece may have its temperature decreased by twenty-five percent. The data piece that was moved may have its portion of the I/O statistics moved to the storage area it was moved to. The reverse would be true for data that is consolidated from several pieces into a single piece.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for maintaining accurate I/O statistics in a tiered storage environment, the method comprising:

maintaining, by a tiered storage layer within a storage system, I/O statistics for data storage areas within the storage system;

migrating, by the tiered storage layer, data between storage tiers in accordance with the I/O statistics;

altering, by a data services layer that operates independently from the tiered storage layer, selected data within the storage system;

generating, by the data services layer, a message describing the alteration, the message identifying the selected data, how the selected data before the alteration maps to the selected data after the alteration, and an operator to be applied to I/O statistics associated with the selected data as a result of the alteration;

transmitting the message from the data services layer to the tiered storage layer; and applying, by the tiered storage layer, the operator to the I/O statistics associated with the selected data to yield updated I/O statistics associated with the selected data.

2. The method of claim 1, wherein altering the selected data comprises compressing the selected data by a certain percentage.

3. The method of claim 1, wherein altering the selected data comprises decompressing the selected data by a certain percentage.

4. The method of claim 1, wherein applying the operator to the I/O statistics associated with the selected data comprises applying a percentage to the I/O statistics associated with the selected data in accordance with a compression ratio applied to the selected data.

5. The method of claim 1, wherein applying the operator to the I/O statistics associated with the selected data comprises applying a percentage to the I/O statistics associated with the selected data in accordance with a decompression ratio applied to the selected data.

6. A computer program product for maintaining accurate I/O statistics in a tiered storage environment, the computer program product comprising a computer-readable storage medium having computer-usable program code embodied therein, the computer-usable program code configured to perform the following when executed by at least one processor:

maintain, by a tiered storage layer within a storage system, I/O statistics for data storage areas within the storage system;

migrate, by the tiered storage layer, data between storage tiers in accordance with the I/O statistics;

alter, by a data services layer that operates independently from the tiered storage layer, selected data within the storage system;

generate, by the data services layer, a message describing the alteration, the message identifying the selected data, how the selected data before the alteration maps to the selected data after the alteration, and an operator to be applied to I/O statistics associated with the selected data as a result of the alteration;

transmit the message from the data services layer to the tiered storage layer; and apply, by the tiered storage layer, the operator to the I/O statistics associated with the selected data to yield updated I/O statistics associated with the selected data.

7. The computer program product of claim 6, wherein altering the selected data comprises compressing the selected data by a certain percentage.

8. The computer program product of claim 6, wherein altering the selected data comprises decompressing the selected data by a certain percentage.

9. The computer program product of claim 6, wherein applying the operator to the I/O statistics associated with the selected data comprises applying a percentage to the I/O statistics associated with the selected data in accordance with a compression ratio applied to the selected data.

10. The computer program product of claim 6, wherein applying the operator to the I/O statistics associated with the selected data comprises applying a percentage to the I/O statistics associated with the selected data in accordance with a decompression ratio applied to the selected data.

11. A system for maintaining accurate I/O statistics in a tiered storage environment, the system comprising:

at least one processor;

at least one memory device operably coupled to the at least one processor and storing instructions for execution on the at least one processor, the instructions causing the at least one processor to:

maintain, by a tiered storage layer within a storage system, I/O statistics for data storage areas within the storage system;

migrate, by the tiered storage layer, data between storage tiers in accordance with the I/O statistics;

alter, by a data services layer that operates independently from the tiered storage layer, selected data within the storage system;

generate, by the data services layer, a message describing the alteration, the message identifying the selected data, how the selected data before the alteration maps to the selected data after the alteration, and an operator to be applied to I/O statistics associated with the selected data as a result of the alteration;

transmit the message from the data services layer to the tiered storage layer; and apply, by the tiered storage layer, the operator to the I/O statistics associated with the selected data to yield updated I/O statistics associated with the selected data.

12. The system of claim 11, wherein altering the selected data comprises compressing the selected data by a certain percentage.

13. The system of claim 11, wherein altering the selected data comprises decompressing the selected data by a certain percentage.

14. The system of claim 11, wherein applying the operator to the I/O statistics associated with the selected data comprises applying a percentage to the I/O statistics associated with the selected data in accordance with a compression ratio applied to the selected data.

15. The system of claim 11, wherein applying the operator to the I/O statistics associated with the selected data comprises applying a percentage to the I/O statistics associated with the selected data in accordance with a decompression ratio applied to the selected data.

* * * * *